United States Patent [19]

Conde et al.

[11] Patent Number: 5,280,490
[45] Date of Patent: Jan. 18, 1994

[54] REVERSE GUIDE FIELD FREE ELECTRON LASER

[75] Inventors: Manoel Conde, Cambridge; George Bekefi, Brookline, both of Mass.

[73] Assignee: Massachusetts Institute of Technology, Cambridge, Mass.

[21] Appl. No.: 797,451

[22] Filed: Nov. 22, 1991

[51] Int. Cl.$^5$ .................................................. H01S 3/00
[52] U.S. Cl. ........................................... 372/2; 315/4; 315/5; 372/37
[58] Field of Search ................ 315/4, 5; 372/2, 37

[56] References Cited

U.S. PATENT DOCUMENTS

| | | | |
|---|---|---|---|
| 3,316,439 | 4/1967 | Klüver | 315/3.5 |
| 3,398,376 | 8/1968 | Hirshfield | 330/4.3 |
| 3,450,931 | 6/1969 | Feinstein et al. | 315/5 |
| 4,224,576 | 9/1980 | Granatstein et al. | 330/4 |
| 4,253,068 | 2/1981 | Barnett | 330/4 |
| 4,331,936 | 5/1982 | Schlesinger et al. | 372/2 |
| 4,422,045 | 12/1983 | Barnett | 330/4 |
| 4,466,101 | 8/1984 | Schoen | 372/2 |
| 4,480,234 | 10/1984 | Wachtel | 331/82 |
| 4,533,875 | 8/1985 | Lau et al. | 330/4 |
| 4,571,524 | 2/1986 | Mourier | 315/4 |
| 4,644,548 | 2/1987 | Gold et al. | 372/2 |
| 4,679,197 | 7/1987 | Hsu | 372/2 |
| 4,918,698 | 4/1990 | Fajanas et al. | 372/2 |
| 4,939,740 | 7/1990 | Goforth | 372/2 |

OTHER PUBLICATIONS

Announcement of 15th International Conference On Infrared and Millimeter Waves, Dec. 10-14, 1990.

*Primary Examiner*—Leon Scott, Jr.
*Attorney, Agent, or Firm*—Wolf, Greenfield & Sacks

[57] ABSTRACT

An electromagnetic radiation amplification device comprising an electron gun for introducing a stream of electrons into an electron drift tube/wavequide in which an axial magnetic field and a wiggler magnetic field have been induced to impart a helical gyration to the electrons as they travel parallel to the tube. The axial, or guide, magnetic field is directed in the direction opposite to the direction of propagation of the electrons if the electrons have a right handed helical gyration and is directed in the direction of propagation of the electrons if the electrons have a left handed helical gyration.

22 Claims, 4 Drawing Sheets

REVERSE GUIDE FIELD FREE ELECTRON LASER

This invention was made with government support under contract Number AFOSR-89-0082 awarded by the Air Force. The government has certain rights in the invention.

FIELD OF THE INVENTION

The invention pertains to free electron lasers/masers. More particularly, the invention pertains to free electron lasers/masers in which a stream of electrons passes through a magnetic field comprising both axial and transverse components.

BACKGROUND OF THE INVENTION

Lasers produce an intense, coherent beam of light which is useful in many fields, including, for instance, medical surgery, fiberoptic communications, industrial heating and cutting, and radar. The term laser is an acronym for Light Amplification by Stimulated Emission of Radiation. Although the acronym laser is specific to electromagnetic radiation in the visible spectrum (light), devices exist for producing radiation throughout the electromagnetic spectrum by stimulated emission of radiation. For instance, masers produce Microwave energy Amplification by the Stimulated Emission of Radiation.

Atomic lasers are the most common type of laser in use today. Atomic lasers amplify light at well defined frequencies which correspond to discrete electron energy transitions which occur within the atoms which comprise the lasing medium. For instance, an argon atomic laser can produce light only of a distinct wavelength corresponding to the possible electron energy transitions which may occur within an argon atom.

The present belongs to another class of lasers, known as free electron lasers. Free electron lasers do not depend on discrete energy transitions in atoms, but rather produce radiation through the interaction of free electrons in a magnetic field with an electromagnetic wave. A free electron laser can produce high powered, coherent radiation in a broad range of frequencies, and in theory throughout the entire electromagnetic spectrum dependent on proper matching of operating parameters. Further, while atomic lasers are typically characterized by efficiencies of less than 10%, free electron lasers are theoretically capable of efficiencies in excess of 50%.

In a free electron laser, a stream of free electrons is caused to travel through a vacuum at relativistic speeds (e.g., speeds exceeding of about 10% of the speed of light). The electrons are not tied to atoms as in atomic lasers. Because the electrons are free, they are not limited to particular energy level transitions and, therefore, can be caused to emit radiation essentially throughout the electromagnetic spectrum depending on various conditions. Dozens of schemes have been devised for amplifying electromagnetic radiation by means of free electron interaction.

For a free electron laser to produce electromagnetic radiation of more than negligible power, the electrons in the electron beam must be caused to physically bunch together. This is because the power radiated by a non-bunched stream of electrons is only the power of each electron multiplied by the number of electrons. However, Maxwell's equation dictates that if electrons are bunched together in a group much smaller than the wavelength of the emitted radiation, the power of the radiation is given by the power of each electron multiplied by the number of electrons squared.

Bunching can occur when a light wave traverses an undulating magnetic field because the spatial variations of the field and the electromagnetic wave combine to produce a beat wave (or interference pattern), which is called a ponderomotive wave. The ponderomotive wave propagates at less than the speed of light and thus can be synchronous with the electrons in the electron beam. Electrons which are synchronous with the ponderomotive wave are said to be in resonance with the ponderomotive wave and will thus experience a constant field corresponding to the portion of the ponderomotive wave with which it is traveling in synchronism. The details of the amplification of electromagnetic radiation from this interaction are not dealt with in detail here since detailed explanations can be obtained from other sources, such as the Encyclopedia Of Lasers And Optical Technology, Robert A. Meyers, Editor, Harcourt Brace Jovanovich, 1991 and references cited therein.

In short, proper matching of the velocity of the electrons to the velocity of the ponderomotive wave causes a resonance condition in which a very strong interaction between the electrons and the ponderomotive wave occurs causing electron bunching and stimulated emission of radiation at particular "resonant frequencies". Thus, a free electron laser can be configured to amplify electromagnetic radiation, at least theoretically, throughout the electromagnetic spectrum by proper matching of the energy (velocity) of the electrons and the undulating wiggler field (upon which the ponderomotive wave as well as a component of the electron velocity depend). Amplification is not unlimited, but reaches a saturation point at which radiation emission ceases growing and no greater power (energy per unit time) can be maintained in the laser. Increasing the length of the tube will not increase power once saturation is achieved.

In a free electron laser/maser, stimulated emission of radiation at a particular resonant frequency is induced by the interaction of three elements within an electron drift tube: 1) free traveling electrons, 2) an electromagnetic wave traveling in the same direction as the electrons, and 3) a transverse, undulating magnetic field (which may be produced by a magnetic wiggler). The resonant frequency is dependent upon both the periodicity of the wiggler magnetic field and the energy of the electrons as explained more fully below.

Free electron lasers frequently also employ an axial magnetic field parallel to the direction of propagation of electrons which prevents the electrons from dispersing due to their natural tendency to repel one another. The flux lines of the axial magnetic field are directed in the direction which will tend to reinforce the rotation of the electrons induced by the wiggler field. This axial field is termed the guide field.

The magnetic field produced by the wiggler is transverse to the direction of the electron beam and the guide field. Its signal is selected to add a transverse component to the velocity of the electrons, causing them to travel in helical gyration down the electron drift tube. The electromagnetic wave traveling in the same direction as the electrons should be of a resonant frequency of the system. The interaction of the electromagnetic wave of a proper frequency with the gyrating electrons causes stimulated emission of radiation t the resonant frequency leading to amplification of the wave.

The resonant frequency is dependent upon both the periodicity of the wiggler magnetic field and the axial velocity of the electrons. However, the axial and transverse velocities of the electrons are interdependent. Further, the transverse velocity of the electrons is a function of both the wiggler periodicity and the wiggler field strength. Accordingly, any of (1) the wiggler periodicity, (2) the wiggler field strength, and (3) the axial electron velocity can be adjusted to effect the desired resonant frequency where amplification can occur. (Amplification can also occur at any harmonic of the wiggler periodicity or any harmonic of the fundamental resonant frequency).

As mentioned, the guide field is parallel to the direction of propagation of the electrons in the electron beam. Its direction is typically selected dependent upon the direction of helical rotation of the electrons imparted by the wiggler field. When the electrons travel in a straight line parallel to the guide field, the guide field will have no effect on their motion. However, if the electrons have a velocity component transverse to the guide field, then the guide field will exert a force on the charged particles. Depending on the direction of rotation of the electrons, the guide field will either reinforce the rotation or oppose it. Typically, the guide field is oriented so that its flux lines are directed in the parallel direction which reinforces the helical rotation of the electrons. Thus, if the wiggler field imparts a clockwise rotation to the electrons when viewed looking in the direction of electron propagation (hereinafter termed right handed rotation), the guide field is directed so its flux lines are in the same direction as the direction of propagation of the electron beam. If the wiggler field produces a left handed rotation in the electrons, the guide field is directed so that its flux lines are opposite to the direction of propagation of the electrons so as to reinforce the rotation. Hereinafter these guide field directions, which depend on the electron gyration direction, will be referred to as the forward guide field direction.

A forward guide field leads to an increase in the transverse electron velocity compared to what it would be in the absence of an axial magnetic field, with potential benefits such as enhanced growth rate and efficiency. A reverse axial magnetic guide field would cause the electrons to have less transverse velocity. Thus, it was believed that use of a reverse guide field would reduce the growth rate of the laser because the transverse electron velocities would be reduced.

Free electron lasers typically operate at efficiency levels of less than 10%. Thus, less than 10% of the energy contained in the electron beam is converted into electromagnetic radiation. Further, as the desired output frequency increases, power requirements to obtain the necessary resonant frequency increases rapidly, making power requirements very great for free electron lasers working at the higher microwave frequencies and above.

It is an object of the present invention to provide an improved free electron laser.

It is a further object of the present invention to provide an improved free electron laser with an increased saturation level.

It is another object of the present invention to provide a higher efficiency free electron laser.

SUMMARY OF THE INVENTION

The invention comprises a free electron laser which includes a conventional cathode anode electron gun configuration for injecting a stream of free electrons into a vacuum electron drift tube. A hollow cylindrical solenoid magnet is provided around the drift tube to produce a uniform guide magnetic field in the drift tube parallel to the longitudinal axis of the drift tube and the direction of propagation of the electrons. A magnetic wiggler is also wound around the electron drift tube and is driven by an electric current to cause an undulating magnetic field in the drift tube which imparts a helical rotation to the electrons.

The direction of the guide field is in the reverse direction. In other words, if a wiggler magnetic field is selected to impart a left handed helical rotation to the electrons, the guide magnetic field is directed with its flux lines in the same direction as the direction of propagation of the electrons. If the wiggler field imparts a right handed rotation to the electrons, the guide magnetic field is directed with its flux lines opposite to the direction of propagation of the electrons.

Through the combination of the axial and wiggler fields, the electrons are caused to propagate parallel to and through the electron drift tube with a transverse helical gyration. The magnetic wiggler field and the energy of the electron beam are selected to provide amplification of electromagnetic waves at a particular desired resonant frequency. A magnetron introduces an electromagnetic wave of the desired frequency into the drift tube parallel to the electron beam. The wave is amplified in the electron drift tube by the interaction of the wave with the gyrating electrons in the stream. The drift tube is sized and dimensioned to also act as a waveguide for the particular amplified electromagnetic wave.

With a reverse guide field, the saturation point of the system, i.e., the point of maximum possible electromagnetic radiation in the drift tube, is increased approximately ten fold over lasers employing a forward guide field.

The present invention is particularly useful for producing radiation from the long infrared through the microwave portion of the electromagnetic spectrum.

DETAILED DESCRIPTION OF THE INVENTION

The present invention can be used to amplify electromagnetic energy over a broad range of frequencies and theoretically over the entire electromagnetic spectrum. Therefore, the invention is termed herein an electromagnetic radiation amplification device (EMRAD) rather than a laser or maser. Accordingly, the term EMRAD is inclusive of, but not limited to, lasers and masers.

Figure 1:
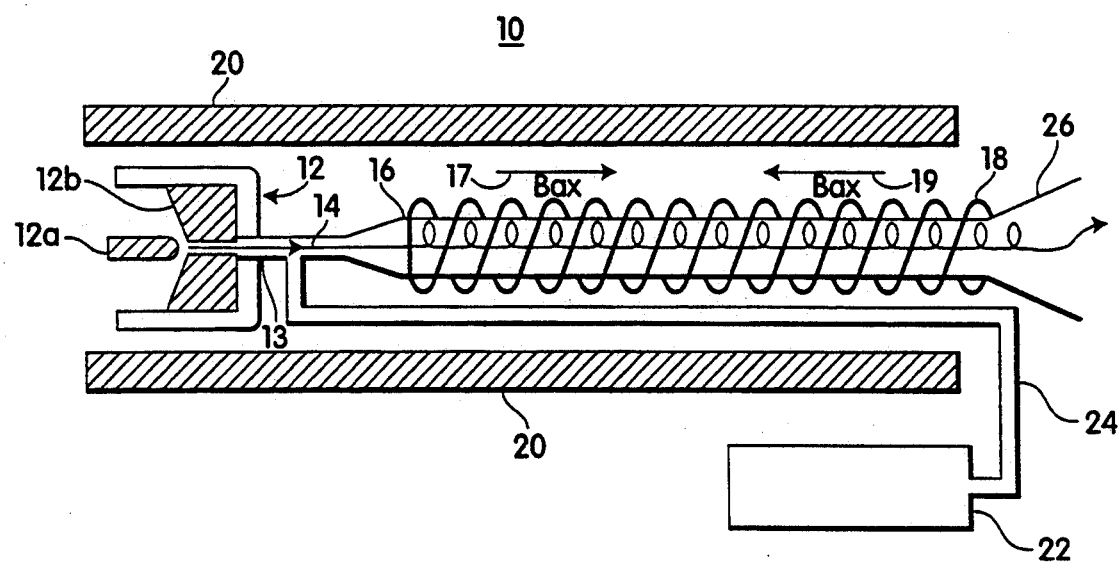
FIG. 1 is cross sectional view of a laser/maser of the present invention.

FIG. 1 is a cross-sectional view of an EMRAD of the present invention. An electron gun 12 comprising a cathode 12a and an anode 12b injects an electron beam 14 into a electron drift tube 16. The electron beam may be generated by several means such as an explosive field emission process using a Pulserad 110A Marx capacitor bank (Physics International). A Marx capacitor bank essentially is a plurality of capacitors coupled in parallel across the cathode 12a and anode 12b. The capacitors are charged to a high voltage and then discharged in series. The voltage is sufficient to cause the electrons to jump from the cathode to the anode. Most electrons pass into the anode while a small percentage passes through the aperture 12c and comprise the electron beam 14. The cathode 12a is preferably a hemispherical graphite cathode. The anode 12b is also preferably made of graphite. The anode functions as an emittance selector, allowing only a fraction of the electron current to propagate through its aperture 13.

The dimension of the electron drift tube 16 are selected such that it also serves the additional function of a waveguide for the desired electromagnetic output wave frequency.

A bifilar helical wiggler 18 comprises current carrying wire helically wrapped around the drift tube. The wiggler period, i.e., the longitudinal distance along the drift tube 16 covered by one 360° revolution of the current carrying wire around the drift tube is 3.18 cm. The wiggler is designed so as to provide an increasing magnetic field strength over the initial six periods, thus providing an adiabatic input for the electron beam.

The entire system, including the electron gun 12, is positioned in a uniform axial magnetic guide field generated by a solenoid 20. The solenoid 20 may comprise a hollow cylindrical iron core wrapped in DC current carrying wire to produce the axial magnetic field.

A magnetron 22 generates an electromagnetic wave of the desired output frequency of the EMRAD. In a preferred embodiment, the apparatus is configured as a maser to output a microwave frequency signal. The microwave spectrum includes wavelengths from about a decameter to about a centimeter. Alternately, the magnetron may be deleted, in which case the device would amplify an ambient background wave near the interaction frequency. If a magnetron is used, a waveguide 24 directs the wave generated by the magnetron 22 into the electron drift tube/wavequide 16. The electromagnetic output from the tube 16 is transmitted from end 26 to the next stage of the EMRAD, if any, or to the output.

When electrons in beam 14 reach the section of the drift tube 16 affected by the magnetic field of the wiggler 18, the wiggler field exerts a transverse force on the electrons adding a circular transverse component to their motion. The combination of electron drift in the axial direction and the transverse rotation causes the electrons to propagate axially down the tube with a helical motion.

The DC current driving the solenoid 20 is directed to create a guide field with flux lines in the direction which opposes the rotation imparted to the electrons by the wiggler 18. Thus, if the electrons are imparted with a left handed rotation as they propagate from left to right down the drift tube in FIG. 1, the axial magnetic field is directed with its flux lines in the direction of electron propagation, as illustrated by arrow 17 in FIG. 1. However, if the electrons are imparted with a right handed rotation, the axial magnetic field is directed with its flux lines in the direction opposite to the direction of propagation of the electrons, as illustrated by arrow 19 in FIG. 1.

The guide field, by opposing the circular rotation of the electrons, tends to decrease the perpendicular velocity and thus the growth rate of electromagnetic radiation in the drift tube. The growth rate is a measure of the amplification of the electromagnetic signal per unit length of the interaction region. However, the decrease in perpendicular velocity can be compensated for by strengthening the wiggler field.

The electromagnetic power level at which saturation occurs in the reverse guide field EMRAD of the present invention is about an order of magnitude greater than a similar system having a forward guide field. Accordingly, an EMRAD having a reverse guide electromagnetic output signal than the same EMRAD with a forward guide field, assuming a sufficiently long interaction region.

In experimentation with an EMRAD having a two meter drift tube, electromagnetic output of approximately a magnitude greater was obtained (without reaching saturation) with a reverse guide field than with a forward guide field (which reached saturation).

In one experimental microwave range setup, a mildly relativistic electron beam of approximately 750 keV was generated by a Marx capacitor bank and injected into a drift tube by an electron gun. The aperture of the anode was a cylinder of radius 2.54 mm and length 62 mm so as to allow only a small fraction of the current to propagate into the drift tube. The wiggler magnetic field was generated by a 50 period bifilar helical wiggler having a period of 3.18 cm. The wiggler field was slowly increased over the initial six periods so as to provide an adiabatic input for the electron beam. The drift tube was two meters long with an internal radius of 0.51 cm. The drift tube also functioned as a cylindrical waveguide whose fundamental $TE_{1-1}$ mode had a cutoff frequency of 17.2 GHz. A magnetron injected a 33.39 GHz wave into the tube through a wavequide. The wavequide comprised a short section of circular waveguide of radius 0.31 cm into which 17 kW are coupled from a standard Ka band rectangular waveguide. The section of circular waveguide supported only the fundamental $TE_{1-1}$ mode for the operating frequency. Its radius was adiabatically up tapered to the radius of the drift tube.

Figure 2A:
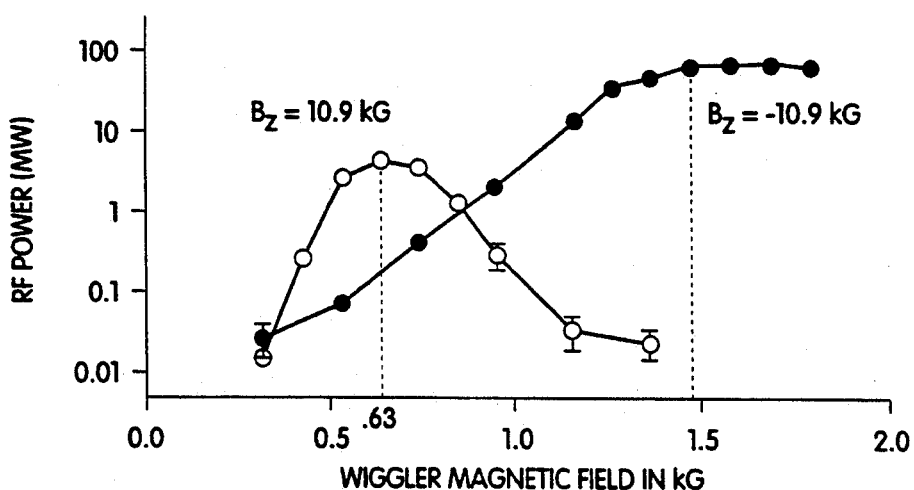
FIG. 2A is a graph showing output power as a function of the wiggler field for forward and reverse guide fields.

Optimum operating conditions were determined for forward and reverse configurations. First, the optimum wiggler field was determined. FIG. 2A is a graph of the output power as a function of wiggler magnetic field for a forward guide field of 10.9 kG and a reverse guide field of 10.9 kG. In FIG. 2A, the forward field is represented by a positive field strength value, whereas the reverse field is represented by a negative field strength value. However, as previously explained, forward and reverse are defined as a function of the direction of transverse rotation of the electrons and, therefore, the positive and negative references used in the Figures are arbitrary. As shown in FIG. 2A, maximum power with a forward guide field was achieved at a wiggler field of 630 G, while maximum output with a reverse guide field was achieved at a wiggler field of 1.47 kG.

Figure 2B:
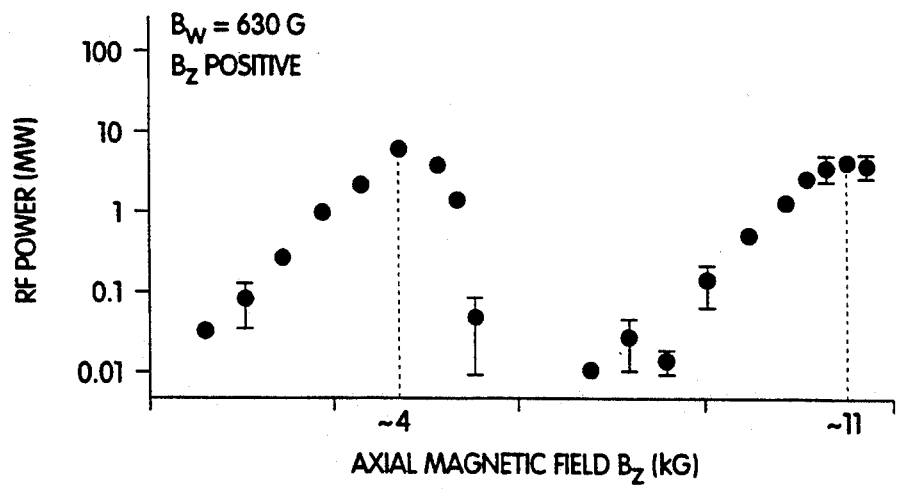
FIGS. 2B and 2C are graphs showing output power as a function of the guide field for given optimum wiggler fields for forward and reverse guide fields, respectively.

Given these optimum wiggler fields for forward and reverse guide fields, optimum guide fields were determined for the forward direction and reverse direction. FIG. 2B is a graph of output power as a function of forward guide field strength for a constant optimum wiggler field of 630 G. The optimum forward guide field is at approximately 4.1 kG, with another peak occurring at about 11 kG.

Figure 2C:
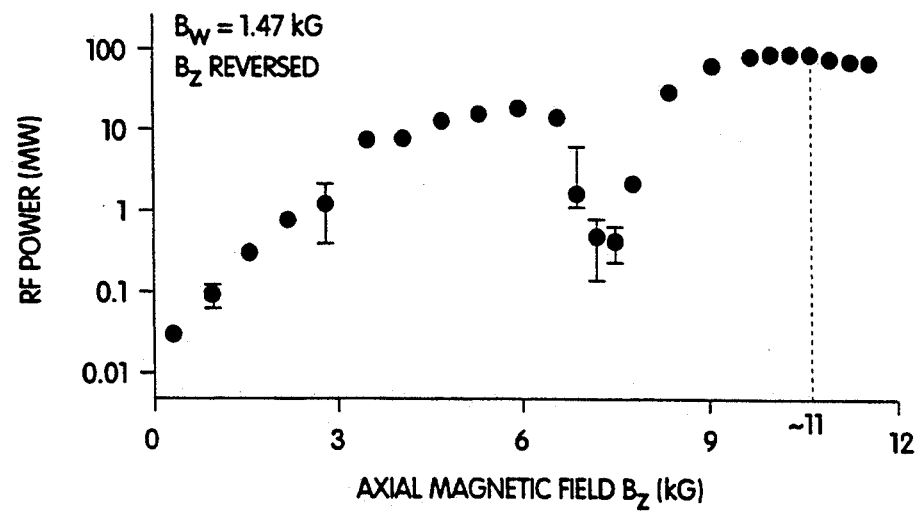

FIG. 2C is a graph of output power as a function of reverse field strength at the optimum wiggler field strength of 1.47 kG. Optimum reverse guide field strength is about 11 kG. Accordingly, three configurations were tested as follows (1) forward guide field of 4.1 kG and wiggler field of 630 G (weak forward field), (2) forward guide field of 10.9 kG and wiggler field of 630 G (strong forward guide field), and (3) reverse guide field of 10.9 kG and wiggler field of 1.47 kG (reverse guide field).

The frequency, power, and growth rate of the output waves were determined for the three configurations. The output frequency was the expected 33.39 GHz in all cases. The output power for both forward axial field configurations was approximately 5 MW. The output power for the reverse guide field configuration was approximately 61 MW.

The growth rates were determined by measuring the output power as a function of the length of the interaction region. The interaction was halted at various positions in the drift tube by application of a strong magnetic field which deflected the electrons into the drift tube wall thereby terminating the interaction.

Figure 3A:
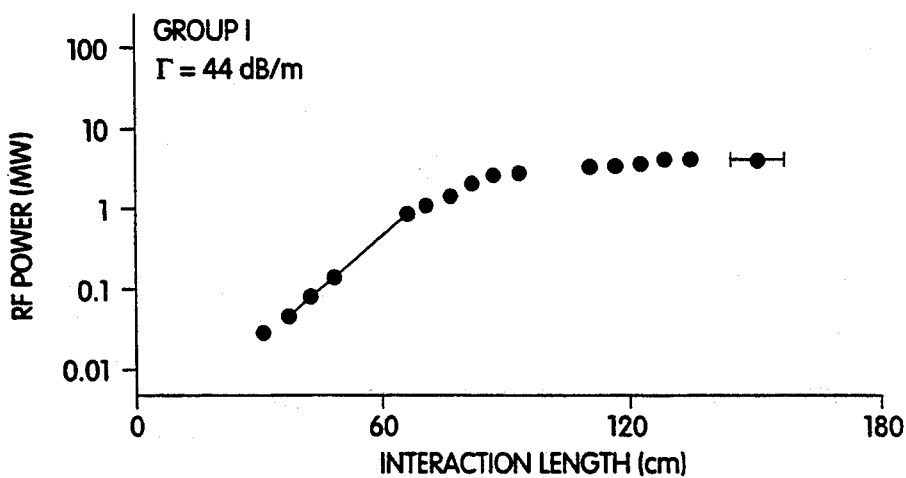
FIGS. 3A, 3B, and 3C are graphs of the electromagnetic radiation power produced as a function of the interaction length for two prior art free electron lasers/masers and the present invention, respectively.
Figure 3B:
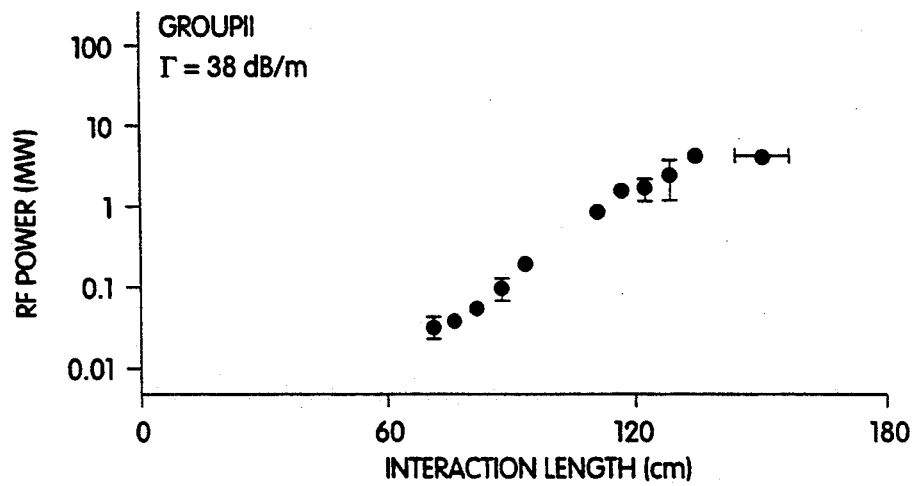
Figure 3C:
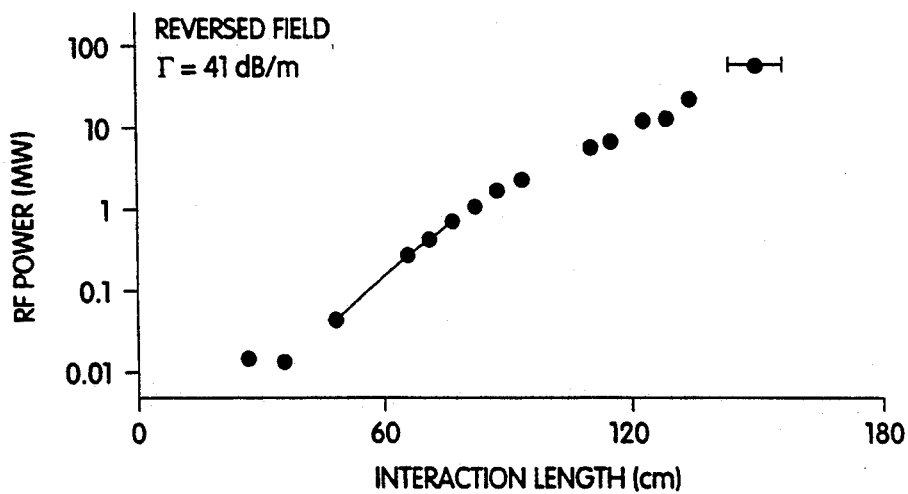

FIGS. 3A, 3B and 3C are logarithmic graphs of the power output as a function of length of interaction for the (1) weak forward guide field configuration, (2) strong forward guide field configuration, and (3) reverse guide field configuration, respectively. Growth rate is given by the slope of the curves. The weak forward guide field configuration had a maximum growth rate of 44 dB per meter with saturation occurring an approximately 5 MW. The strong forward guide field configuration had a maximum growth rate of approximately 38 dB per meter, also saturating at approximately 5 MW. The reverse guide field configuration had a growth rate of 41 dB per meter (somewhere between the weak forward and strong forward configuration) but had not even reached saturation by 160 cm, where the power level was 61 MW, over an order of magnitude greater than the forward fields. A longer interaction length presumably would allow the power output to be even greater.

The maser operated with an efficiency of 27% in the reverse guide field configuration. 9% in the weak forward guide field configuration, and 2% in the strong forward guide field configuration.

Although the reasons why the present invention provides higher saturation and efficiency are not precisely known, there are two theoretical explanations for part or all of the improvement. Both reasons relate to improved beam quality, or beam uniformity, in a reverse guide field. First, it appears that in a reverse guide field, the helically gyrating electrons have much more uniform orbits than in a forward guide field such that a higher percentage of electrons are traveling in the velocity range necessary for interaction to occur. The wiggler field in the drift tube is not transversely uniform. The strength of the wiggler field differs as a function of the transverse distance from the center of the tube. Accordingly, the radius of the helical motion of any given electron depends on its distance from the longitudinal axis of the drift tube. In a reverse guide field, the electrons are less sensitive to the transverse gradient of the wiggler field than in a forward guide field and thus have much more uniform orbital radii (transverse velocity). The following equation gives the approximate transverse (perp) and parallel (par) velocities of the electrons in the interaction region.

$$\frac{v_{perp}}{v_{par}} = \frac{2\Omega_{perp} I_1(\lambda)/\lambda}{-\Omega_{par} + k_{perp} v_{par} - 2\Omega_{perp} I_1(\lambda)}$$

where, $v_{perp}$ = transverse velocity of electrons,
$v_{par}$ = parallel velocity of electrons, $$\Omega_{perp} = \frac{eB_{perp}}{\gamma m},$$

$$\Omega_{par} = \frac{eB_{par}}{\gamma m},$$

e = electric charge of an electron = $1.602 \times 10^{-19}$ C,
m = electron mass = $9.1095 \times 10^{-31}$ kg, $$\gamma = \frac{1}{\left[1 - \frac{v_{perp}^2}{c} - \frac{v_{par}^2}{c}\right]^{\frac{1}{2}}}$$

$k_{perp} = 2\pi/l_{perp}$
$l_{perp}$ = wiggler period
$I_1(\lambda)$ = modified Bessel function =

$$\frac{\lambda}{2} + \frac{\lambda^3}{2^2 \times 4} + \frac{\lambda^5}{2^2 \times 4^2 \times 6} + \frac{\lambda^7}{2^2 \times 4^2 \times 6^2 \times 8} + \cdots$$

$B_{perp}$ = wiggler field strength
$B_{par}$ = guide field strength
c = speed of light = $2.998 \times 10^8$ m/sec The equation is an approximation because it assumes certain ideal conditions. In particular, the equation assumes that (1) the electrons enter the wiggler field directly on the central axis of the drift tube, (2) the electrons enter the wiggler field with no transverse velocity, and (3) the electrons do not lose energy, either through radiation or otherwise, in the interaction region (i.e., the wiggler field). The equation shows that the transverse (perp) and parallel (par) velocities are interdependent and that more uniform orbital radii provide more uniform parallel electron velocities.

The velocities also must obey the following equation:

$$v_0^2 = v_{par}^2 + v_{perp}^2$$

where, $v_0$ = initial axial velocity of the electrons before entering the wiggler field.

Figure 4:
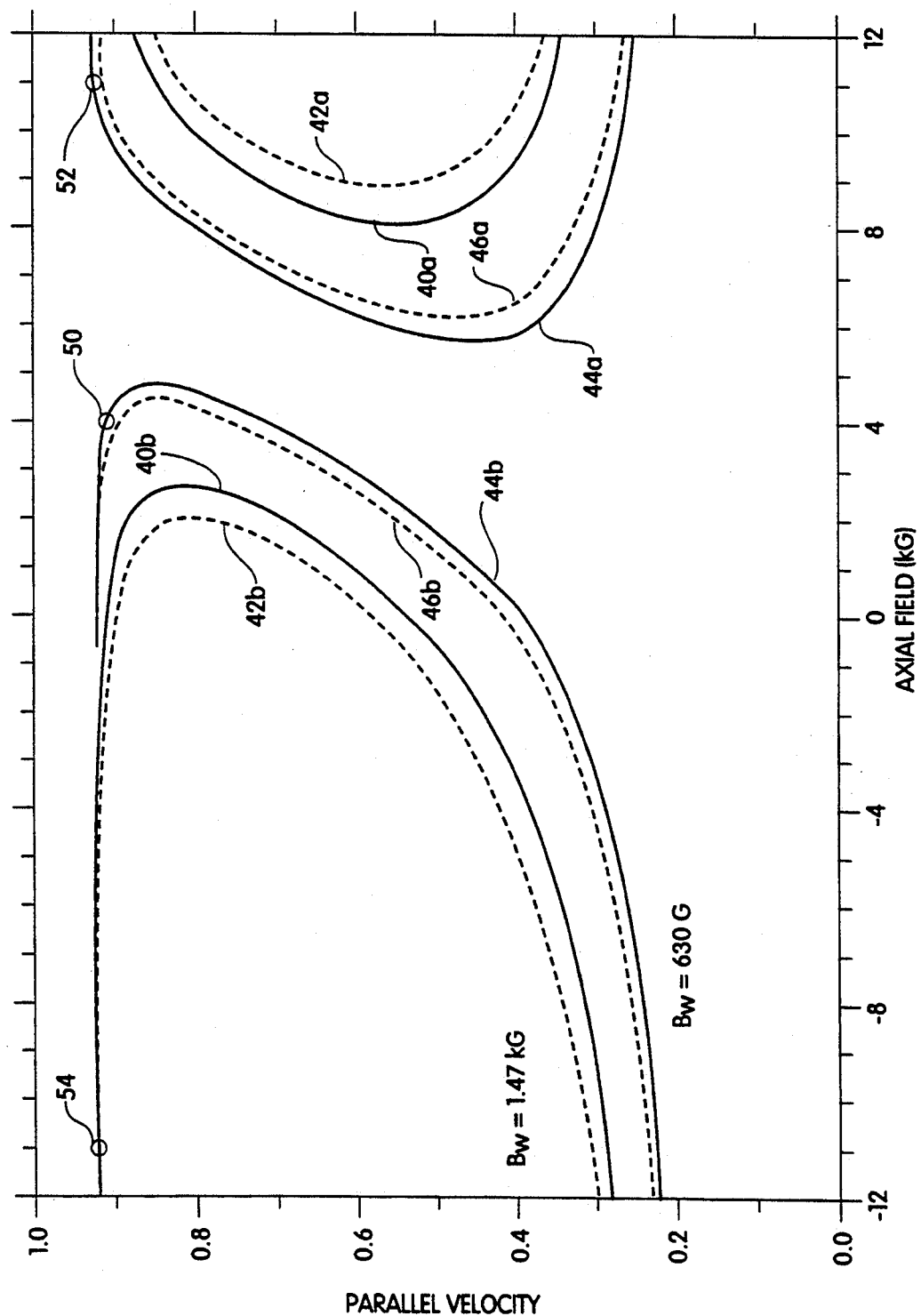
FIG. 4 is a graph showing the relationship of the velocity of the electrons to axial field strength under various wiggler field strengths.

FIG. 4 graphically illustrates the first above for different fixed wiggler field strengths and shows that the parallel velocity of the electrons is less effected by a gradient in the wiggler field when the axial guide field is in the reverse direction than when it is in the forward direction. FIG. 4 assumes that the electrons are experiencing ideal helical orbits in the combined magnetic field. It shows the parallel velocity of the electrons as a function of the axial field strength for different wiggler field strengths under the previously set forth optimum forward and reverse conditions. Particularly, curves 40a and 40b show the expected parallel velocity of the electrons as a function of guide field strength from −12 kG to +12 kG for a wiggler field strength of 1.47 kG (the optimum wiggler field for a reverse guide field). In FIG. 4, the negative axial field range represents a reverse field, whereas the positive range represents a forward field. Curves 42a and 42b show the same relation for a 20% stronger wiggler field, i.e., 1.76 kG, such as may exist near the edges of the drift tube due to the wiggler field gradient. Curves 44a and 44b show the expected parallel velocity of the electrons as a function of guide field strength from −12 kG to +12 kG for a given wiggler field strength of 630 G, the optimum wiggler field for a forward guide field. Finally, curves 46a and 46b show the same relation for a 20% stronger wiggler field, i.e., 750 G.

The operating points for the three previously discussed optimum field configurations, namely, (1) weak forward field, (2) strong forward field, and (3) reverse field, are shown by circles 50, 52 and 54, respectively. As can be seen, with the optimum weak forward guide field of 4.1 kG (circle 50 in FIG. 4) and the optimum strong forward field of 10.9 kG (circle 52 in FIG. 4), a 20% gradient in the wiggler field in the drift tube would lead to a much larger difference in parallel electron velocities at the edge of the tube compared to the central axis of the tube than occurs in the optimum reverse guide field (circle 54 in FIG. 4).

The second possible reason for the improved efficiency also relates to beam quality. As previously noted, the graph of FIG. 4 is based on the assumption that all the electrons enter the interaction region (enter the wiggler field) with no transverse velocity. However, in actuality, there is some initial spread in transverse velocity of electrons as they enter the interaction region. As the electrons radiate energy in the interaction region, the spread in transverse velocity tends to increase, further reducing beam quality.

Computer simulations indicate that the increase in spread in velocities of the electrons in the interaction region in a reverse guide field is much smaller than in a forward guide field. As before, this allows more electrons to be within the desired velocity range.

A possible explanation for the reduction in transverse velocity spread is that, in the optimum reverse field configuration as previously determined, the device operates far from the magnetic resonance condition (not related to the resonant frequency discussed previously) as opposed to either the optimum weak forward field configuration or the optimum strong forward field configuration. Referring again to FIG. 4, it can be seen that, for all wiggler field strengths shown, there is a range of axial field strengths (centered around 5 kG) which the curves do not cover. This is the range over which a magnetic resonance condition exists which prevents stable operation. Transverse velocity spread increases more quickly in the interaction region when the operating conditions approach the magnetic resonance condition. As shown in FIG. 4, the operating conditions are relatively close to the magnetic resonance condition for both optimum forward field configurations (see circles 50 and 52 in FIG. 4), whereas the operating conditions for the reverse field configuration (see circle 54 in FIG. 4) are far from the magnetic resonance condition.

Accordingly, if one or both of these observations are correct, then a higher percentage of electrons having a velocity within the range necessary for the stimulated emission of radiation to occur are found in the present invention than in the prior art.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An electromagnetic radiation amplification device comprising;
    means for producing a stream of electrons propagating through a space in a first direction at a relativistic velocity,
    means for providing an undulating magnetic field in said space in a direction transverse to said direction of propagation of said electron stream so as to impart a circular rotation component to said electrons transverse to said direction of propagation of said electron stream,
    means for providing an axial magnetic guide field in said space overlapping in space with said undulating magnetic field and parallel to the direction of propagation of said electron stream, said axial magnetic field directed such that it opposes the rotation of the electrons imparted by the undulating magnetic field.

2. An electromagnetic radiation amplification device as set forth in claim 1 further comprising an electron drift tube defining said space.

3. An electromagnetic radiation amplification device as set forth in claim 2 further comprising means for introducing an electromagnetic wave into said space.

4. An electromagnetic radiation amplification device as set forth in claim 3 wherein said electromagnetic wave is of a frequency which can be amplified by interaction with said electron stream.

5. An electromagnetic radiation amplification device as set forth in claim 4 wherein said frequency is in the microwave spectrum.

6. An electromagnetic radiation amplification device as set forth in claim 5 wherein said electron drift tube has dimensions such that it functions as a waveguide for electromagnetic radiation of said frequency.

7. An electromagnetic radiation amplification device as set forth in claim 6 wherein said means for providing said axial magnetic field comprises a solenoid positioned around said electron drift tube.

8. An electromagnetic radiation amplification device as set forth in claim 7 wherein said means for providing said undulating magnetic field comprises a magnetic wiggler.

9. An electromagnetic radiation amplification device as set forth in claim 7 wherein said rotation is a right-handed rotation and said axial magnetic guide field is in a direction opposite to said first direction.

10. An electromagnetic radiation amplification device as set forth in claim 7 wherein said rotation is a left-handed rotation and said axial magnetic guide field is in said first direction.

11. An electromagnetic radiation amplification device comprising;
   an electron drift tube having a longitudinal axis,
   an electron gun for introducing a stream of electrons into said electron drift tube parallel to said longitudinal axis of said electron drift tube,
   a magnetic wiggler positioned around said electron drift tube for inducing an undulating magnetic field in said electron drift tube transverse to said longitudinal axis, said field imparting a circular transverse rotation component to electrons comprising said electron stream,
   a solenoid positioned around said electron drift tube for inducing a magnetic guide field in said electron drift tube parallel to said longitudinal axis and overlapping in space with said undulating magnetic field, said magnetic guide field being in a direction which opposes said rotation imparted to said electrons by said magnetic wiggler,
   a magnetron for introducing an electromagnetic wave into said electron drift tube traveling parallel to said longitudinal axis.

12. An electromagnetic radiation amplification device as set forth in claim 11 wherein said guide field is uniform.

13. An electromagnetic radiation amplification device as set forth in claim 12 wherein said magnetic wiggler comprises at least one current carrying wire wrapped helically around said drift tube.

14. An electromagnetic radiation amplification device as set forth in claim 13 wherein said solenoid comprises a hollow cylinder positioned concentric with said electron drift tube.

15. An electromagnetic radiation amplification device as set forth in claim 14 wherein said electromagnetic radiation amplification device is configured to operate to amplify microwave frequency electromagnetic waves and said magnetron introduces a microwave frequency electromagnetic wave into said electron drift tube.

16. A method for amplifying electromagnetic radiation comprising the steps of;
   producing a stream of electrons propagating through a space in a first direction at a relativistic velocity,
   generating an undulating magnetic field in said space in a direction transverse to said direction of propagation of said electron stream so as to impart a circular rotation component to said electrons transverse to said direction of propagation of said electron stream,
   generating an axial magnetic guide field in said space parallel to the direction of propagation of said electron stream and overlapping in space with said undulating magnetic field, said axial magnetic field directed such that it opposes the rotation of the electrons imparted by the undulating magnetic field.

17. A method for amplifying electromagnetic radiation as set forth in claim 16 further including the step of introducing an electromagnetic wave into said space.

18. A method of amplifying electromagnetic radiation as set forth in claim 17 wherein said electromagnetic wave is of a frequency which can be amplified by interaction with said electron stream.

19. A method of amplifying electromagnetic radiation as set forth in claim 18 wherein said frequency is in the microwave spectrum.

20. A method of amplifying electromagnetic radiation as set forth in claim 19 wherein said rotation is a right-handed rotation and said axial magnetic guide field is in a direction opposite to said first direction.

21. A method of amplifying electromagnetic radiation as set forth in claim 19 wherein said rotation is a left-handed rotation and said axial magnetic guide field is in said first direction.

22. A method of amplifying electromagnetic radiation as set forth in claim 21 wherein said guide field is uniform.

* * * * *